(12) United States Patent
Zientara et al.

(10) Patent No.: US 10,941,762 B2
(45) Date of Patent: Mar. 9, 2021

(54) PISTON LIMIT SENSING AND SOFTWARE CONTROL FOR FLUID APPLICATION

(71) Applicant: Wagner Spray Tech Corporation, Plymouth, MN (US)

(72) Inventors: Daniel R. Zientara, Lakeville, MN (US); Lam H. Nguyen, Woodbury, MN (US); Jonathan L. Schaumann, Champlin, MN (US)

(73) Assignee: Wagner Spray Tech Corporation, Plymouth, MN (US)

( * ) Notice: Subject to any disclaimer, the term of this patent is extended or adjusted under 35 U.S.C. 154(b) by 174 days.

(21) Appl. No.: 15/468,611

(22) Filed: Mar. 24, 2017

(65) Prior Publication Data

US 2017/0199513 A1 Jul. 13, 2017

Related U.S. Application Data

(63) Continuation-in-part of application No. 15/005,169, filed on Jan. 25, 2016.
(Continued)

(51) Int. Cl.
*F04B 49/06* (2006.01)
*F04B 49/02* (2006.01)
(Continued)

(52) U.S. Cl.
CPC .......... *F04B 49/065* (2013.01); *B05B 9/0413* (2013.01); *B05B 12/081* (2013.01);
(Continued)

(58) Field of Classification Search
CPC .......... F04B 49/02; F04B 49/03; F04B 49/06; F04B 2201/0201; F04B 51/00;
(Continued)

(56) References Cited

U.S. PATENT DOCUMENTS 3,195,043 A 7/1965 Burig et al.
3,776,252 A 12/1973 Wilcox
(Continued)

FOREIGN PATENT DOCUMENTS

CN 103221893 A 7/2013
CN 203476918 U 3/2014
(Continued)

OTHER PUBLICATIONS

Amendment with RCE filed for U.S. Appl. No. 15/005,169 dated Feb. 25, 2019, 12 pages.
(Continued)

*Primary Examiner* — Kenneth J Hansen
(74) *Attorney, Agent, or Firm* — Christopher R. Christenson; Kelly, Holt & Christenson, PLLC

(57) ABSTRACT

A liquid delivery system is presented. The liquid delivery system comprises a source of fluid coupled to an outlet. The liquid delivery system also includes a hydraulic cylinder coupled to the source of fluid. The hydraulic cylinder has a piston movable between a first limit position and a second limit position during an operational cycle. The hydraulic cylinder is configured to pressurize fluid received from the source of fluid, and deliver the pressurized fluid to the outlet. The liquid delivery system also comprises a rod connected to the piston and extending out of the cylinder. The liquid delivery system also comprises a sensor configured to sense a position of the rod to provide a signal indication of the piston with respect to the first position or the second position. An indication of the sensed position is provided to a controller, and the controller is configured to send a control signal to initiate a normal operation loop based on the sensed position.

14 Claims, 14 Drawing Sheets

Related U.S. Application Data

(60) Provisional application No. 62/353,165, filed on Jun. 22, 2016, provisional application No. 62/109,796, filed on Jan. 30, 2015.

(51) Int. Cl.
  *F04B 51/00* (2006.01)
  *B05B 9/04* (2006.01)
  *F04B 15/02* (2006.01)
  *G05B 19/416* (2006.01)
  *B05B 12/08* (2006.01)

(52) U.S. Cl.
  CPC .............. *F04B 15/02* (2013.01); *F04B 49/02* (2013.01); *F04B 49/06* (2013.01); *F04B 51/00* (2013.01); *G05B 19/416* (2013.01); *F04B 2201/0201* (2013.01); *G05B 2219/41312* (2013.01)

(58) Field of Classification Search
  CPC ........ F04B 49/065; F04B 15/02; F04B 9/105; B05B 9/0409; B05B 9/0413; G05B 19/416; G05B 19/41312
  See application file for complete search history.

(56) References Cited

U.S. PATENT DOCUMENTS

| | | | |
|---|---|---|---|
| 4,030,857 A | 6/1977 | Smith, Jr. | |
| 4,035,109 A | 7/1977 | Drath et al. | |
| 4,047,591 A | 9/1977 | Ward | |
| 4,119,113 A | 10/1978 | Meginniss, III | |
| 4,195,970 A | 4/1980 | Zalis | |
| 4,310,143 A | 1/1982 | Determan | |
| 4,355,280 A | 10/1982 | Duzich | |
| 4,435,626 A | 3/1984 | Coffin | |
| 4,475,346 A | 10/1984 | Young | |
| 4,494,677 A | 1/1985 | Falcoff | |
| 4,531,491 A | 6/1985 | Iiyama | |
| 4,526,053 A | 7/1985 | Carson | |
| 4,628,499 A | 12/1986 | Hammett | |
| 4,684,062 A * | 8/1987 | Bagwell | E01C 19/174 239/1 |
| 4,701,112 A | 10/1987 | Eisenhut et al. | |
| 4,715,012 A | 12/1987 | Mueller, Jr. | |
| 4,785,615 A | 11/1988 | Leigh-Monstevens | |
| 4,787,481 A | 11/1988 | Farrar | |
| 4,853,629 A | 8/1989 | Rops | |
| 4,990,058 A | 2/1991 | Eslinger | |
| 4,994,984 A | 2/1991 | Massimo | |
| 5,115,194 A | 5/1992 | Luetzow et al. | |
| 5,139,044 A | 8/1992 | Otten et al. | |
| 5,201,838 A | 4/1993 | Roudaut | |
| 5,305,917 A | 8/1994 | Miller | |
| 5,346,037 A | 9/1994 | Flaig et al. | |
| 5,367,944 A | 11/1994 | Akeel et al. | |
| 5,435,697 A | 7/1995 | Guebeli et al. | |
| 5,557,154 A | 9/1996 | Erhart | |
| 5,725,358 A | 3/1998 | Bert et al. | |
| 6,017,200 A | 1/2000 | Childs et al. | |
| 6,074,170 A | 6/2000 | Bert | |
| 6,135,719 A * | 10/2000 | Yoder | F04B 9/105 137/551 |
| 6,168,387 B1 * | 1/2001 | Able | F04B 15/02 324/207.16 |
| 6,205,853 B1 | 3/2001 | Dei et al. | |
| 7,467,927 B2 | 12/2008 | Wood | |
| 7,737,685 B2 | 6/2010 | Low et al. | |
| 7,744,354 B2 | 6/2010 | Lilie | |
| 8,215,922 B2 | 6/2012 | Berger | |
| 8,424,596 B2 | 4/2013 | Bebb | |
| 8,668,464 B2 | 3/2014 | Kensy | |
| 8,845,298 B2 | 9/2014 | Larsen | |
| 8,997,628 B2 | 4/2015 | Sall et al. | |
| 9,140,247 B2 | 9/2015 | Herre | |
| 9,677,549 B2 | 6/2017 | Bauck et al. | |
| 9,752,701 B2 | 9/2017 | Dubus et al. | |
| 2002/0028103 A1 | 3/2002 | Frank | |
| 2004/0238661 A1 | 12/2004 | Schroeder et al. | |
| 2005/0146252 A1 | 7/2005 | Chuang | |
| 2005/0231192 A1 | 10/2005 | Ketelaars et al. | |
| 2006/0245942 A1 | 11/2006 | Hofmann et al. | |
| 2008/0187449 A1 | 8/2008 | Breidenbach | |
| 2008/0203189 A1 | 8/2008 | Cho et al. | |
| 2010/0163638 A1 | 7/2010 | Herre et al. | |
| 2010/0301134 A1 | 12/2010 | Anderton et al. | |
| 2011/0020143 A1 | 1/2011 | Van Brunt et al. | |
| 2011/0044830 A1 | 2/2011 | Scott | |
| 2012/0262159 A1 | 10/2012 | Pellin et al. | |
| 2013/0142672 A1 * | 6/2013 | Blackson | F04B 9/113 417/53 |
| 2014/0035563 A1 | 2/2014 | Tan et al. | |
| 2014/0138399 A1 | 5/2014 | Estelle | |
| 2014/0234122 A1 | 8/2014 | Donohoe et al. | |
| 2015/0192431 A1 * | 7/2015 | Jonsjord | E21B 33/0355 324/207.11 |
| 2015/0217312 A1 | 8/2015 | Hines | |
| 2016/0102685 A1 | 4/2016 | Chester | |
| 2016/0169223 A1 | 6/2016 | Paul et al. | |
| 2016/0222995 A1 | 8/2016 | Zientara | |
| 2019/0072118 A1 | 3/2019 | Zientara et al. | |

FOREIGN PATENT DOCUMENTS

| | | |
|---|---|---|
| EP | 1 536 135 A2 | 6/2005 |
| EP | 1460393 B1 | 8/2013 |
| EP | 3250824 A1 | 12/2017 |
| WO | WO 03/006173 A1 | 1/2003 |
| WO | WO 2004010096 A1 | 1/2004 |
| WO | WO 2004/038440 A1 | 5/2004 |
| WO | WO/2004/103888 A2 | 5/2005 |
| WO | WO/2009/127051 A1 | 10/2009 |
| WO | WO 2013/178579 A1 | 12/2013 |

OTHER PUBLICATIONS

International Search Report for International Patent Application No. PCT/US2017/032064, dated Aug. 23, 2017, date of filing: May 11, 2017. 13 pages.
First Office Action for Chinese Patent Application No. 201680005583.4 dated Jul. 2, 2018, 20 pages.
Application and Drawings for U.S. Appl. No. 16/123,680, filed Sep. 6, 2018, 30 pages.
Prosecution History for U.S. Appl. No. 15/005,169 including: Non-Final Office Action dated Apr. 10, 2018, and Application and Drawings filed Jan. 25, 2016, 41 pages.
Amendment for U.S. Appl. No. 15/005,169 dated Jul. 10, 2018, 9 pages.
Youtube video, "Graco HFR Hydraulic Actuator," https://www.youtube.com/watch?v=bDOw6rMnOCM, Published Apr. 15, 2012.
Youtube video, "Graco Hydraulic Pump Operation.wmv," https://www.youtube.com/watch?v=C7T5JuoXIVE, Published Jan. 31, 2013.
International Search Report and Written Opinion for International Patent Application No. PCT/US2016/014818, dated May 24, 2016, date of filing: Jan. 26, 2016, 16 pages.
Final Office Action for U.S. Appl. No. 15/005,169 dated Nov. 27, 2018, 24 pages.
Second Office Action for Chinese Patent Application No. 201680005583.4 dated Dec. 25, 2018, 17 pages.
International Preliminary Report for International Patent Application No. PCT/US2017/032084, dated Jan. 3, 2019, date of filing: May 11, 2017, 10pages.
Extended European Search Report for European Application No. 16743926.4 dated Sep. 13, 2018, 11 pages.
International Search Report and Written Opinion for International Patent Application No. PCT/US2018/049866, dated Dec. 18, 2018, date of filing: Sep. 7, 2018, 18 pages.
Non-Final Office Action for U.S. Appl. No. 15/005,169 dated Apr. 8, 2019, 25 pages.

(56) References Cited

OTHER PUBLICATIONS

Third Office Action for Chinese Patent Application No. 201680005583.4 dated Apr. 19, 2019, 19 pages with English Translation.
Final Office Action for U.S. Appl. No. 15/005,169 dated Aug. 29, 2019, 29 pages.
Amendment for U.S. Appl. No. 15/005,169 dated Aug. 8, 2019, 12 pages.
Article 94 for European Patent Applicaton No. 16743926.4 dated Sep. 4, 2019, 5 pages.
Extended Search Report for European Patent Application No. 17815861.4 dated Nov. 29, 2019, 7 pages.
Restriction Requirement for U.S. Appl. No. 16/123,680 dated Aug. 14, 2020, 7 pages.
International Preliminary Report on Patentability for International Patent Application No. PCT/US2018/049866, dated Mar. 19, 2020, 12 pages.
First Office Action for Chinese Patent Application No. 201780037405.4 dated Jun. 19, 2020, 19 pages with English Translation.
Non-Final Office Action for U.S. Appl. No. 16/123680 dated Nov. 12, 2020. 20 pages.
First Office Action for Crlinese Patent Application No. 201860057749.6 dated Nov. 24, 2020, 17 pages with English Translation, b.
Second Office Action for Chinese Patent Application No. 201780037405, dated Jan. 6, 2021, 17 pages with English Translation.

* cited by examiner

PISTON LIMIT SENSING AND SOFTWARE CONTROL FOR FLUID APPLICATION

CROSS-REFERENCE TO RELATED APPLICATION

The present application is based on and claims the benefit of U.S. Provisional Patent Application Ser. No. 62/353,165, filed Jun. 22, 2016, and is a Continuation-in-Part of U.S. patent application Ser. No. 15/005,169, filed Jan. 25, 2016, which claims the benefit of U.S. Provisional Patent Application Ser. No. 62/109,796, filed Jan. 30, 2015, the contents of which application is hereby incorporated by reference in its entirety.

BACKGROUND

Liquid delivery systems are used to deliver fluid from a source location to a delivery location. In some instances, liquid delivery systems include a pump system configured to provide the liquid at a desired operational pressure. Liquid delivery systems are useful for a variety of fluids, for example paints, primers, and other exemplary fluids.

SUMMARY

A liquid delivery system is presented. The liquid delivery system comprises a source of fluid coupled to an outlet. The liquid delivery system also includes a hydraulic cylinder coupled to the source of fluid. The hydraulic cylinder has a piston movable between a first limit position and a second limit position during an operational cycle. The hydraulic cylinder is configured to pressurize fluid received from the source of fluid, and deliver the pressurized fluid to the outlet. The liquid delivery system also comprises a rod connected to the piston and extending out of the cylinder. The liquid delivery system also comprises a sensor configured to sense a position of the rod to provide a signal indication of the piston with respect to the first position or the second position. An indication of the sensed position is provided to a controller, and the controller is configured to send a control signal to initiate a normal operation loop based on the sensed position.

DETAILED DESCRIPTION

Figure 1:
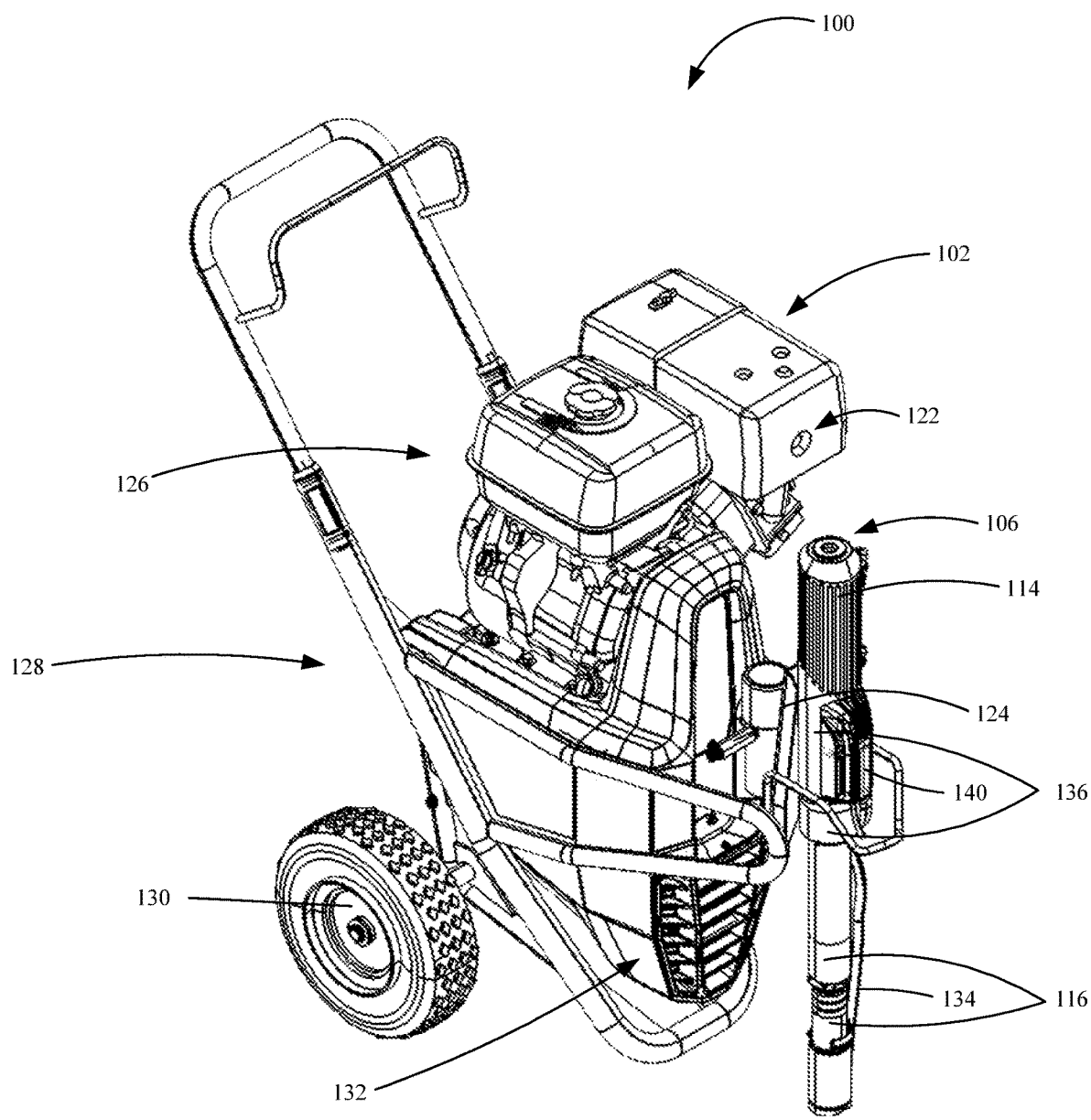
FIG. 1 depicts a painting system in accordance with an embodiment of the present invention.

The present disclosure relates to liquid pumps, and more specifically, to a limit sensing system used to determine the position of a piston in a liquid delivery system. Position sensing can provide instantaneous analog or digital electronic position feedback information about the piston within a cylinder.

Aspects of the present disclosure relate to hydraulic powered liquid pumps, more particular aspects relate to a limit sensing system used to determine the position of a piston in a liquid delivery system, and control thereof. While the present disclosure is not necessarily limited to such applications, various aspects of the disclosure may be appreciated through a discussion of various examples using paint as context.

According to various embodiments, the liquid delivery system can include a hydraulic cylinder. The hydraulic cylinder can be a mechanical actuator that distributes a force on a liquid using reciprocating piston strokes. The piston is connected to a piston rod or other suitable structure and movement of the piston causes the reciprocal movement of the piston rod. The cylinder is closed on one end by a cylinder top (hereinafter referred to as the head) and on the other end by a cylinder bottom (hereinafter referred to as the base) where the piston rod comes out of the cylinder. In a hydraulic powered liquid delivery system, the hydraulic cylinder derives its power from a pressurized hydraulic fluid. In certain embodiments, an actuator (e.g., a solenoid valve) can direct the hydraulic fluid flow generated by a hydraulic pump through a first port (e.g., a port near the head hereinafter referred to as the head port) located on the cylinder. As the hydraulic fluid is directed by the actuator to the head port, pressure builds in the cylinder to force the piston to move from the head, through the cylinder, and to the base.

In various embodiments, a limit sensing system can be used to detect that the piston has reached the end of its stroke. The limit sensing system can include a magnet and reed switches. The magnet and reed switches may be controlled by a MOSFET (metal-oxide semiconductor field-effect transistor) and flip-flop integrated circuit system, in one example. In another example, the limit sensing system is controlled by a processor and integrated software. One advantage of software-based control, with hydraulic pump systems, is the ability to verify sensor functionality and detect a piston location prior to start-up. Integrated software may be configured to start a normal operational loop based on a detected location of the piston within the loop. The use of software-based control also allows for other additional software control features, for example a total cycle counter, real-time cycle rate tracking, real-time gallons-per-minute tracking, total gallons pumped, and/or run-time tracking. Information concerning such features may be downloadable to a separate computing device, for example, allowing for parameter tracking over the lifetime of a system. Software-based control may also comprise live cycle rate counting, which may enable tracking and updating of pump cycles per minute. This may enable performance tracking without additional hardware configured to manually count cycles.

During each piston stroke, a portion of the piston rod remains outside the cylinder, regardless of the location of the piston inside the cylinder. In particular embodiments, the magnet is located on this portion of the piston rod (on the opposite side of the base of the cylinder as the piston), enabling the magnet to remain outside the cylinder as well. When the piston has completed a stroke, the magnetic field created by the magnet causes the reed switch to change state. The reed switch can be connected to an electrical circuit that can feed logic gates that enable the actuator to direct the hydraulic fluid through the valve into a second port (e.g., a port near the base hereinafter referred to as the rod port) located on the cylinder. The reed switch can also be connected, in another example, to a controller, such that data concerning piston location, reed switch state, and magnetic field can be reported and/or stored over time, allowing for system performance tracking. As the hydraulic fluid is directed by the actuator to the rod port, pressure builds in the cylinder to force the piston to move from the base, through the cylinder, and to the head. During this process, the hydraulic fluid is forced into the head port, back into the actuator, and returned to a hydraulic fluid reservoir. As the piston moves from the base to the head, the magnetic field applied to the reed switch decreases and the reed switch will change its state (open if application of the magnetic field forced it to close and close if application of the magnetic field forced it to open). As the piston draws near the head and approaches the second reed switch, its magnetic field causes the second reed switch to change its state.

In various embodiments, since the magnet is located on the portion of the piston rod that is outside of the cylinder, the magnet is not exposed to the pressurized hydraulic fluid inside the cylinder. This may protect the magnet from damage and corrosion that could occur from exposure to the hydraulic fluid if the magnet was located in the cylinder (e.g., on the piston). Moreover, if the magnet becomes damaged (e.g., cracked or has depleted magnetic properties), it may need to be repaired or replaced. However, because the magnet is located outside the cylinder, the hydraulic pump does not need to be disassembled to repair or replace the magnet.

According to particular embodiments, the reed switches may also be located outside the cylinder. As a result, in a paint delivery system, the reed switches, reed switch connectors, and an electrical circuit board may be exposed to paint. In particular embodiments, the reed switches and the reed switch connectors can be hermetically sealed and the electrical circuit board can be enclosed to protect them from damage, corrosion, and depletion of sensor properties that may be caused from exposure to the paint.

A controller may be located proximate the cylinder, in one example, and may be responsible for control of the piston rod. In another example, the controller may be located elsewhere within the pump system, such that commands are generated by the controller, and received by a receiving component proximate the piston rod.

Embodiments of the present disclosure will now be described more fully hereinafter with reference to the accompanying figures. However, there can be several embodiments of the present invention and the present invention is not limited to the embodiments set forth herein. The embodiments disclosed are provided so that this disclosure can fully convey the scope of the invention to those skilled in the art. For example, in another embodiment, the reed switch state is monitored by a processor. Therefore, the following detailed description is not to be taken in a limiting sense.

FIG. 1 depicts a painting system in accordance with an embodiment of the present invention. Painting system 100 that includes an upper shroud 126, a frame 128, wheels 130, a lower shroud 132, a motor system 102, a solenoid valve (not shown in FIG. 1) under the lower shroud 132, a pump assembly 106, a hydraulic motor 136, and a paint reservoir (not shown). Motor system 102 can be electrically powered, gas powered, etc. and can include a hydraulic pump 140 under lower shroud 132 and a hydraulic fluid reservoir (not shown in FIG. 1) also under lower shroud 132. The hydraulic pump delivers hydraulic fluid (e.g., oil) from the hydraulic fluid reservoir to the solenoid valve. The solenoid valve can be an electromechanical device that includes a solenoid, a head port on the valve body and a rod port on the valve body. The head port on the valve body and the rod port on the valve body can be controlled by an electric current through the solenoid. For the solenoid valve, the electric current can alternate the flow from the head port on the valve body and the rod port on the valve body.

In one example, the solenoid is coupled to a controller 140. In one example, the controller comprises a MOSFET and flip-flop integrated circuit system. In another example, the solenoid is controlled by a computer processor and integrated software, for example a circuit board. The circuit board may be communicably coupled, directly to the solenoid. In one example, the controller is also coupled to a memory, such that the controller can report, or store, collected information from a cycle counter and/or a run-time tracker. The controller may be useful to measure performance of the pump system without manual cycle counting.

According to various embodiments, pump assembly 106 includes a hydraulic cylinder 114 and a paint pump 116. The solenoid valve directs the hydraulic fluid, generated by the hydraulic pump, through the head port on the valve body to a head port 122 of hydraulic cylinder 114. As the hydraulic fluid is directed by the solenoid valve through head port 122 of hydraulic cylinder 114, pressure builds in the cylinder and forces the hydraulic piston to move. As the hydraulic piston moves through cylinder, the hydraulic fluid is forced through a rod port 124 of hydraulic cylinder 114, into the solenoid valve through the rod port on the valve body, and returned to the hydraulic fluid reservoir. In addition, a hydraulic piston rod (not shown in FIG. 1), connected to the hydraulic piston, can also be connected to a paint piston rod (not shown in FIG. 1). As a result, the hydraulic piston moves the paint piston rod through paint pump 116 to pump paint from the paint reservoir to an outlet hose 134 connected to a paint applicator (not shown in FIG. 1).

In particular embodiments, a magnet is connected to the hydraulic piston rod. Moreover, at least two sensors are located outside the cylinder that correspond to the two limit positions of the hydraulic piston at each end of its stroke, hereinafter referred to as a stroke limit position. In certain embodiments, the sensor can be a reed switch. A reed switch is an electrical switch operated by an applied magnetic field. It may consist of a pair of contacts on reeds in a hermetically sealed airtight envelope constructed from a suitable material, such as glass or plastic. In certain embodiments, the contacts can be open, making no electrical contact. The switch can be closed by bringing the magnet near the switch. Once the magnet is pulled away, the reed switch will open again. In other embodiments, the contacts can be closed and the switch can be opened by bringing the magnet near the switch. Once the magnetic field is removed, the reed switch closes.

In one example, one or more limit sensors are coupled to a controller (not shown in FIG. 1). The controller may, using the one or more limit sensors, detect a position of the piston rod. Detecting a position of the piston rod, during start-up for example, may be helpful to start a normal operation loop.

In some previous systems, uncertainty in piston-location can make starting a normal operation loop difficult. For example, the piston may be mid-stroke, topped out, bottomed out, etc. The software-controlled controller may be able to detect a location of the piston, and engage a corresponding operation loop.

The controller may also be configured to track cycles, for example by updating a cycle-rate count after each completed cycle, and run-time for the pump system. This may allow for calculation of performance parameters without adding additional hardware to the pump system to manually count cycles.

For example, as the hydraulic piston moves from the head through the cylinder, a magnet located on the hydraulic piston rod moves closer to a first reed switch. When the hydraulic piston has reached a stroke limit position in the cylinder, the magnetic field closes the first reed switch and completes an electrical circuit (not shown in FIG. 1). In an example using a MOSFET and flip-flop integrated circuit control system, the electrical circuit can provide a voltage or other suitable indication that activates a set of metal oxide semiconductor field effect transistors (MOSFETs) and flip-flop integrated circuit, or other suitable switching devices, to change the state of the solenoid. In another example, the controller comprises integrated software configured to change the state of the solenoid. Once the solenoid state changes, the hydraulic fluid can now be released from the rod port on the valve body, into the cylinder through rod port 124 of hydraulic cylinder 114. As the hydraulic piston moves through the cylinder in the opposite direction, the magnetic field strength, with respect to the first reed switch, decreases and the first reed switch opens. Moreover, the hydraulic fluid can be pushed back through head port 122 of hydraulic cylinder 114, into the solenoid valve through the head port on the valve body, and returned to the hydraulic fluid reservoir. The paint piston rod can then move through paint pump 116 and continue to pump paint from the paint reservoir. When the hydraulic piston has reached a stroke limit position, the magnetic field causes a second reed switch to close, thereby completing the electrical circuit, and reverse the hydraulic fluid flow from the solenoid valve.

In another embodiment, a hall-effect sensor system can be used to determine when the hydraulic piston has reached the end of a piston stroke. A hall-effect sensor system can include a magnet and a sensor. In various embodiments, the hall-effect sensor system can be hermetically sealed or enclosed. The sensor can be a transducer that varies its output voltage in response to an applied magnetic field produced by the magnet. When the hydraulic piston has reached a stroke limit position, the magnet is located at a position such that its magnetic field is perpendicular with respect to the sensor. The perpendicular magnetic field can induce the output voltage from the sensor that enables the solenoid valve to alternate the flow of the hydraulic fluid. In one example, the hall-effect sensor is communicably coupled to a controller, such that the controller can detect a current position of the piston within an operational loop, during start-up, for example.

In another embodiment, a photoelectric sensor is used to determine that the hydraulic piston has reached a stroke limit position. A photoelectric sensor is a device used to detect the distance, absence, or presence of an object by using a light transmitter and a photoelectric receiver. In yet further embodiments, other sensors can be used that include, but are not limited to, mechanical sensors, base active transducer sensors, eddy-current sensors, inductive position sensors, photodiode array sensors, and proximity sensors. In particular embodiments, the sensor systems can be hermetically sealed or enclosed to protect them from exposure to the paint. In one example, the photoelectric sensor is communicably coupled to a controller, such that the controller can detect a current position of the piston within an operational loop.

However, in other embodiments, other suitable sensors may be used. In another embodiment, an anisotropic magneto-resistive (AMR) magnetic sensor is used. In a further embodiment, a giant magneto-resistive (GMR) magnetic sensor is used.

Figure 2A:
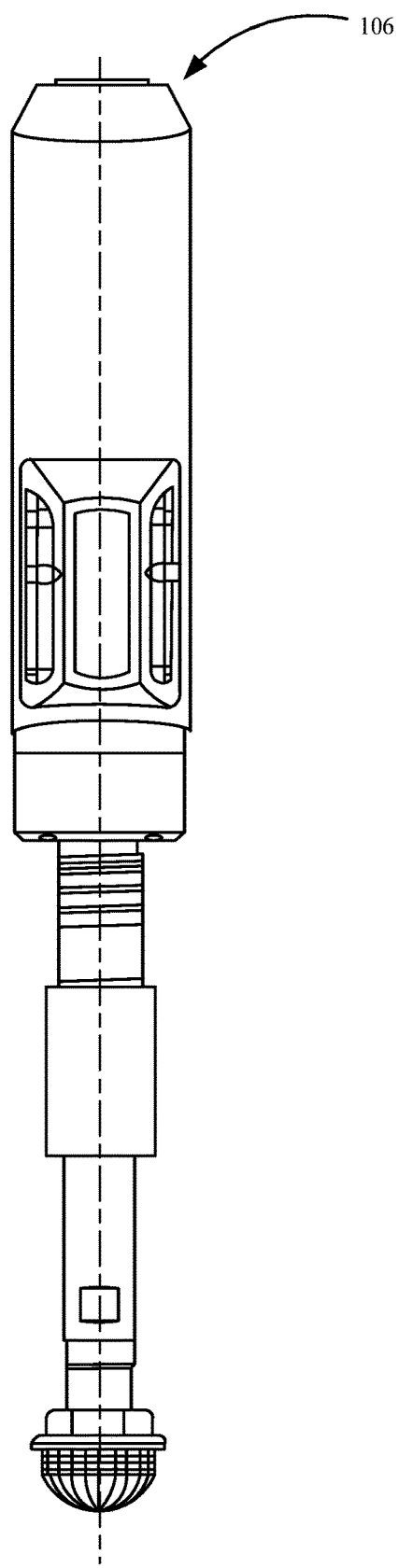
FIGS. 2A-2B depict a pump assembly in accordance with an embodiment of the present invention.
Figure 2B:
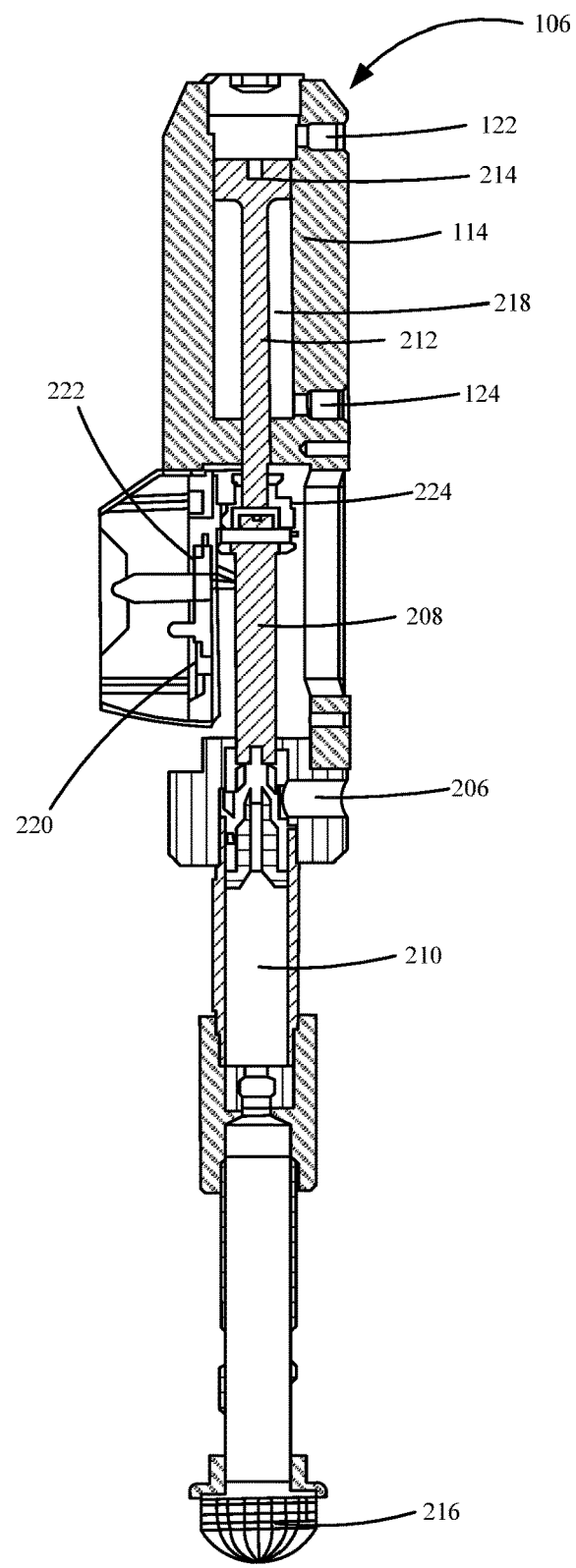

FIGS. 2A-2B depict a pump assembly in accordance with an embodiment of the present invention. FIG. 2A depicts an outside view of pump assembly 106 and FIG. 2B depicts an inside view of pump assembly 106. As can be seen in FIG. 2B, pump assembly 106 includes head port 122 of hydraulic cylinder 114, rod port 124 of hydraulic cylinder 114, a hose outlet 206, a paint piston rod 208, a paint pump cavity 210, a hydraulic piston rod 212, a hydraulic piston 214, a paint intake 216, a hydraulic cylinder cavity 218, a first reed switch 220, a second reed switch 222, and a magnet 224. An actuator (e.g., solenoid valve) directs a hydraulic fluid into hydraulic cylinder cavity 218 through head port 122 of hydraulic cylinder 114. The hydraulic fluid forces hydraulic piston 214 to move down through hydraulic cylinder cavity 218. As hydraulic piston 214 moves down through hydraulic cylinder cavity 218, paint piston rod 208 moves down through paint pump cavity 210 and pushes the paint out hose outlet 206. In addition, hydraulic fluid is forced back through rod port 124 of hydraulic cylinder 114, into the solenoid valve and returned to a hydraulic fluid reservoir.

In one example, when hydraulic piston 214 is at a stroke limit position, magnet 224 causes first reed switch 220 to close and complete an electrical circuit (not shown in FIG. 2B). The electrical circuit provides a voltage or other suitable indication that reverses the state of the solenoid valve and causes the hydraulic fluid to flow into hydraulic cylinder cavity 218 through rod port 124 of hydraulic cylinder 114, thereby reversing the direction of piston 214. As piston 214 travels up, the hydraulic fluid is forced back through head port 122 of hydraulic cylinder 114, into the solenoid valve and returned to the hydraulic fluid reservoir. Paint piston rod 208 also moves up through paint pump cavity 210 and draws the paint through paint intake 216. When the hydraulic piston has reached its upper stroke limit position, magnet 224 causes second reed switch 222 to close, thereby completing an electrical circuit and reversing the hydraulic fluid flow into hydraulic cylinder cavity 218 through head port 122 of hydraulic cylinder 114.

The integrated software controller may allow for parameter-tracking of performance metrics of pump assembly 106. For example, the integrated software controller may comprise a cycle counter configured to track total cycles and run-time over the operational lifetime of assembly 106.

Figure 3:
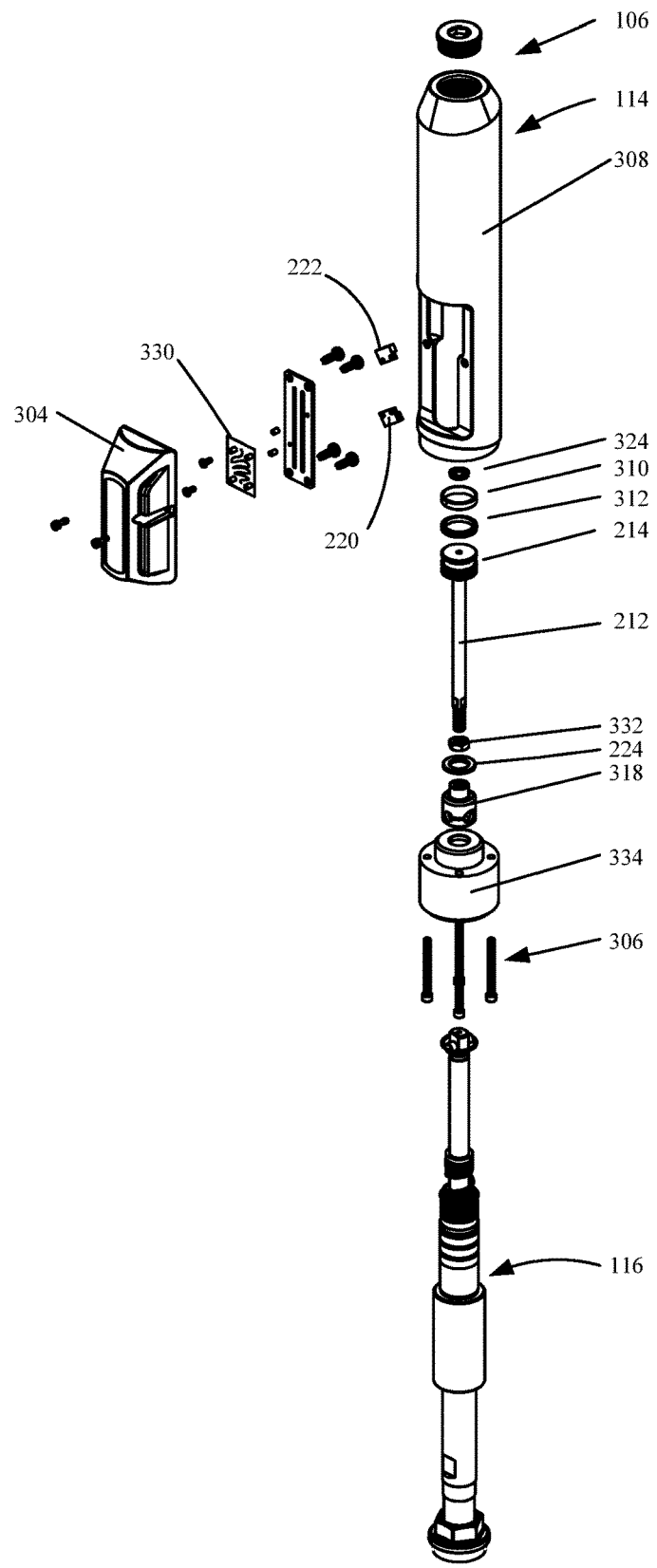
FIG. 3 depicts an exploded view of a pump assembly in accordance with an embodiment of the present invention.

FIG. 3 depicts an exploded view of a pump assembly in accordance with one embodiment of the present invention. Pump assembly 106 includes hydraulic cylinder 114, paint pump 116, and sensor cover assembly 304. Sensor cover assembly 304 can prevent paint from entering the area where the paint piston rod (e.g., paint piston rod 208, from FIG. 2) and hydraulic piston rod 212 are coupled together and can prevent paint from reaching magnet 224 and reed switches 220 and 222. In addition, sensor cover assembly 304 can include first reed switch 220, second reed switch 222, and a circuit board 330.

As shown in FIG. 3, hydraulic cylinder 114 can include hydraulic cylinder fasteners 306, cylinder 308, piston head wear ring 310, piston head seal 312, hydraulic piston 214, hydraulic piston rod 212, magnet 224, hydraulic piston coupler 318, piston rod seal 324, jam nut 332, and a fluid section block 334. Hydraulic cylinder fasteners 306 securely attaches cylinder 308 to fluid section block 334. Cylinder 308 can include hydraulic cylinder cavity 218, from FIG. 2, head port 122 of hydraulic cylinder 114, from FIG. 2, and rod port 124 of hydraulic cylinder 114, from FIG. 2. Piston head wear ring 310 is a ring that fits into a groove on the outer diameter of hydraulic piston 214. Piston head seal 312 can be a dynamic seal. It can be single acting or double acting and it can be made from nitrile rubber, polyurethane, fluorocarbon viton, etc. Jam nut 332 can lock the hydraulic piston coupler onto piston rod 212 and hydraulic piston coupler 318 can attach hydraulic piston rod 212 to a paint piston rod (e.g., paint piston rod 208, from FIG. 2).

Figure 4A:
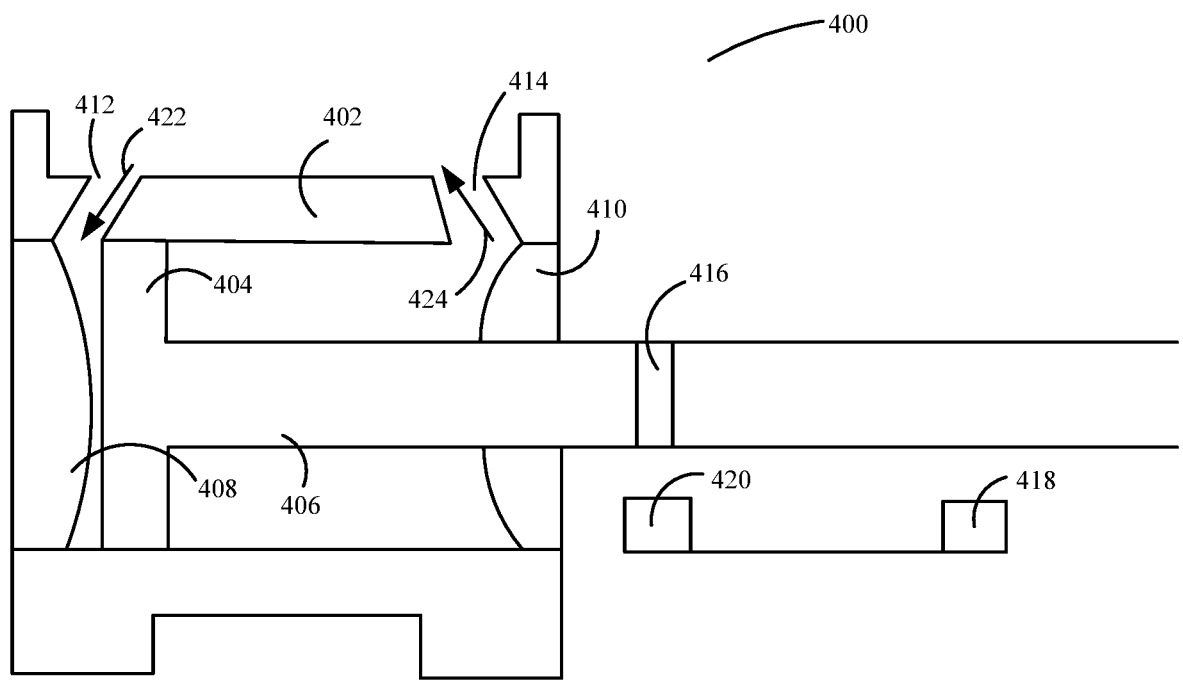
FIGS. 4A-4B depict a cylinder with a limit sensing system in accordance with n embodiment of the present invention.
Figure 4B:
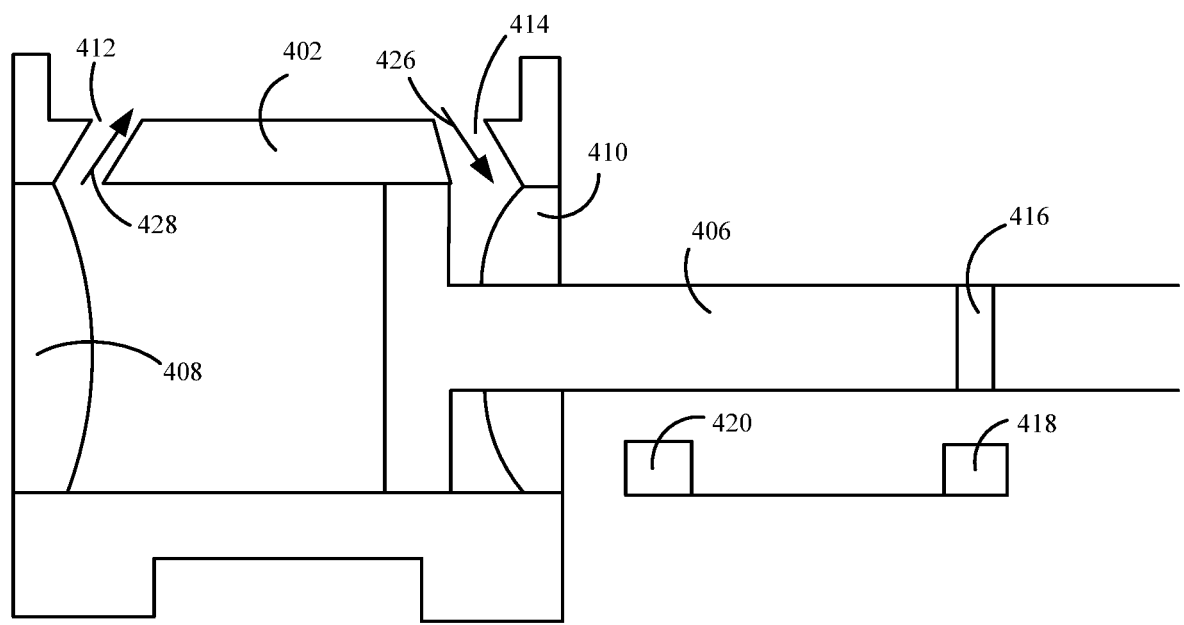

FIGS. 4A-4B depict a cylinder with a limit sensing system in accordance with an embodiment of the present invention. FIG. 4A depicts a pump assembly 400 that includes hydraulic cylinder 402 in a first position with a limit sensing system, consistent with embodiments of the present disclosure. Hydraulic cylinder 402 can include piston 404, piston rod 406, head 408, base 410, head partition 412, base partition 414, magnet 416, first reed switch 420, and second reed switch 418. The limit sensing system may be coupled to an integrated software controller (not shown in FIG. 4A), in one example, which may serve to detect and control movement of piston rod 406, for example by controlling an on/off state of the solenoid valve.

According to various embodiments, as shown in FIG. 4A, piston 404 is initially located at a stroke limit position, near head 408 and magnet 416 causes first reed switch 420 to change state and complete an electrical circuit (not shown in FIG. 4A). The electrical circuit provides a voltage or other suitable signal to reverse the state of an actuator (e.g., a solenoid valve) and direct hydraulic fluid into cylinder 402 through head partition 412 (as shown by arrow 422). As the hydraulic fluid flows through head partition 412, piston 404 is forced away from head 408. As piston 404 moves through cylinder 402, first reed switch 420 changes state and the hydraulic fluid is forced back into the actuator through base partition 414 (as shown by arrow 424).

FIG. 4B depicts hydraulic cylinder 402 in a second position with a limit sensing system, consistent with embodiments of the present disclosure. Magnet 416 is positioned on piston rod 406 such that when piston 404 moves through cylinder 402 and approaches base 410, magnet 416 approaches second reed switch 418 and causes second reed switch 418 to change state. This will complete an electrical circuit and provide a voltage or other suitable signal to reverse the state of the solenoid valve and thus, reverse the flow of the hydraulic fluid and move piston 404 away from base 410. In one example, information about an operation loop is collected by an integrated software controller (not shown in FIG. 4B). Parameter tracking, such as cycle counters and run-time tracking may allow for evaluation of the performance of assembly 400 over time. Additionally, an integrated software controller may allow for determination of a piston location within an operational loop prior to pump start-up.

Figure 5A:
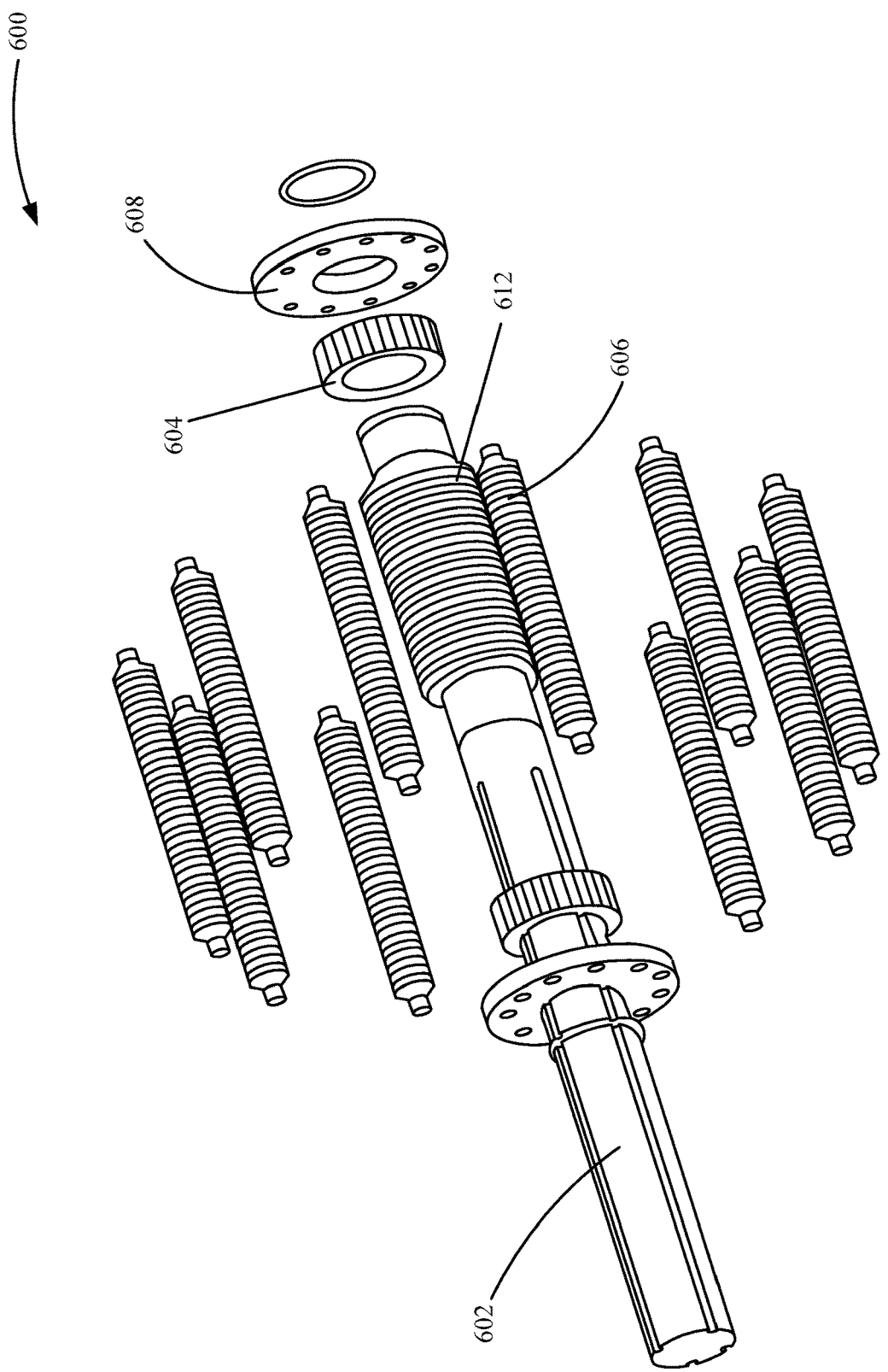
FIGS. 5A-5B depict exploded and assembled views of an planetary roller screw drive in accordance with an embodiment of the present invention.
Figure 5B:
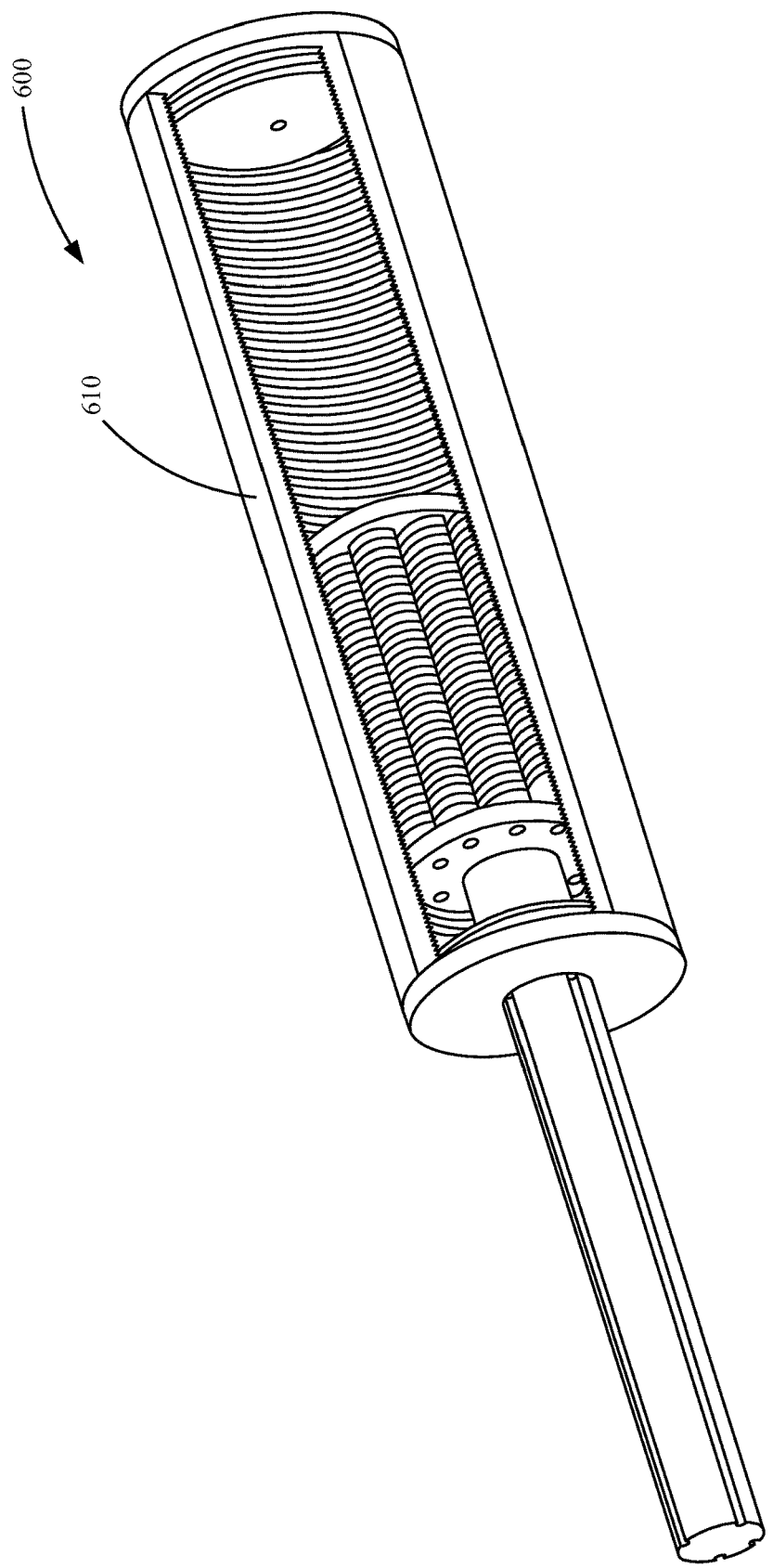

FIGS. 5A-5B depict exploded and assembled views of a planetary roller screw drive in accordance with an embodiment of the present invention. FIG. 5A depicts an exploded view of a planetary roller screw drive 600 and FIG. 5B depicts an assembled view of the planetary roller screw drive 600, consistent with embodiments of the present disclosure. Planetary roller screw drive 600 includes rod 602, cog 604, rollers 606, roller retainer 608, and tube 610. According to various embodiments, planetary roller screw drive 600 can be used in place of, or in combination with, a hydraulic cylinder (e.g., hydraulic cylinder 400). Planetary roller screw drive 600 is a mechanical device for converting rotational motion to linear motion.

According to various embodiments, threaded rod 602 provides a helical raceway or thread 612 for multiple rollers 606 radially arrayed around rod 602 and encapsulated by threaded tube 610. The lead for thread 612 is the axial travel for a single revolution. The pitch of thread 612 is defined as the axial distance between adjacent threads of thread 612. Thread 612 of rod 602 typically has the same pitch or corresponding features to the internal thread of tube 610. Rollers 606 spin in contact with, and serve as transmission elements between rod 602 and tube 610. Rollers 606 typically have a single-start thread where a single helical thread is along their length and the lead and pitch are equal. This can limit the friction as rollers 606 contact rod 602 and tube 610. Rollers 606 orbit rod 602 as they spin and rotation of tube 610 results in rod 602 travel, and rotation of rod 602 results in tube 610 travel.

Figure 6A:
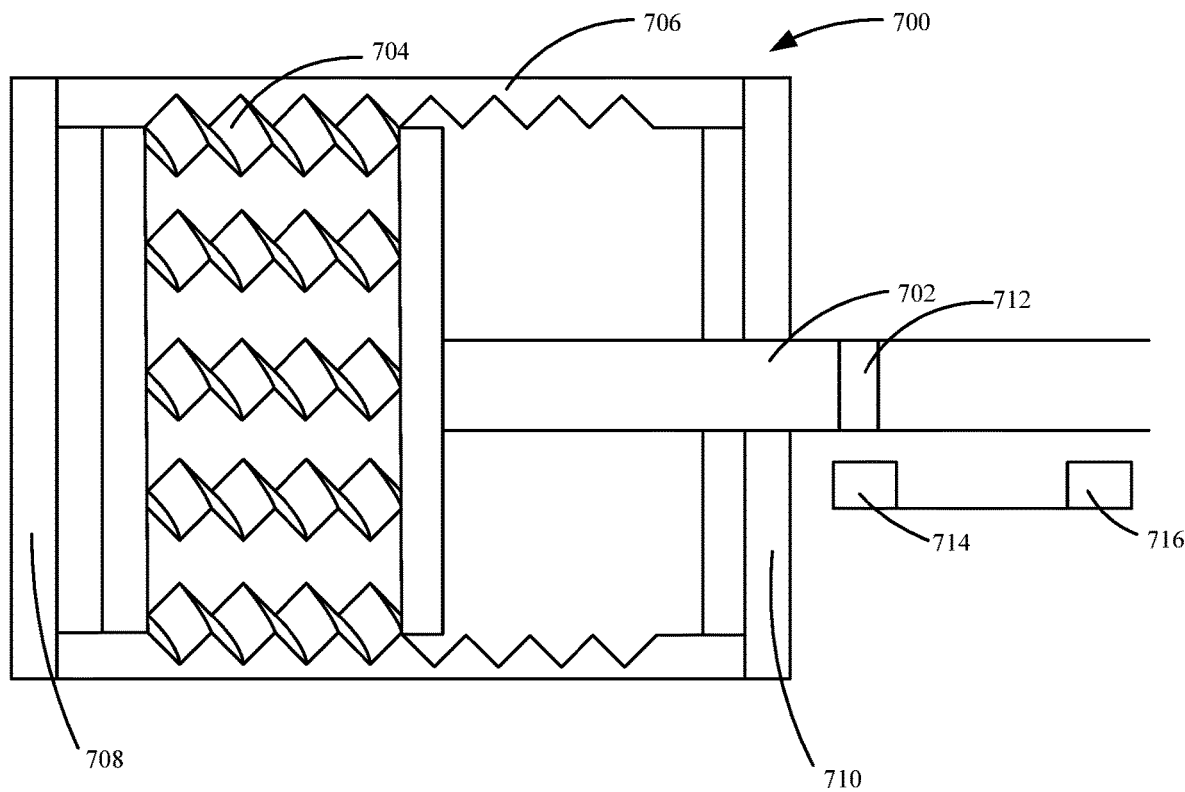
FIGS. 6A-6B depict a planetary roller screw drive with a limit sensing system in accordance with an embodiment of the present invention.
Figure 6B:
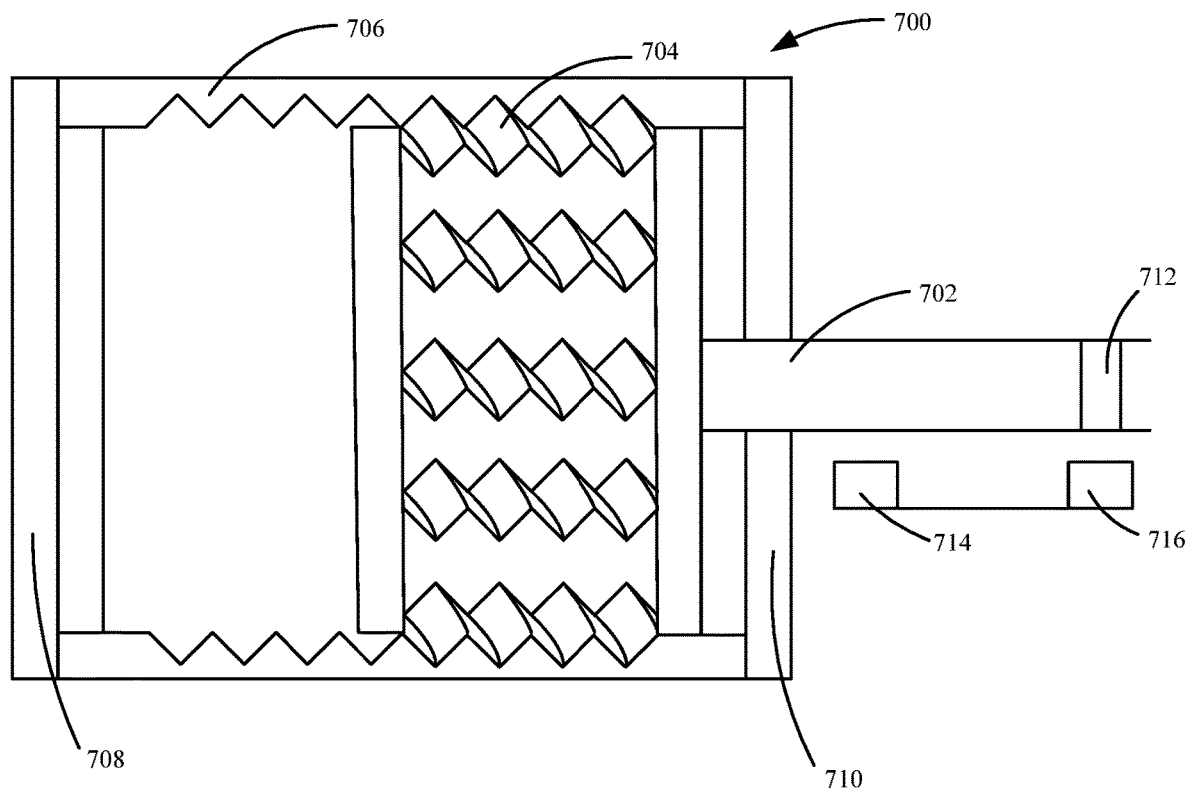

FIGS. 6A-6B depict a planetary roller screw drive with a limit sensing system in accordance with an embodiment of the present invention. FIG. 6A depicts a planetary roller screw drive 700 in a first position with a limit sensing system, consistent with embodiments of the present disclosure. Planetary roller screw drive 700 can include a rod 702, rollers 704, tube 706, head 708, base 710, magnet 712, first reed switch 714, and second reed switch 716.

According to various embodiments, as shown in FIG. 6A, rod 702 is initially located at a stroke limit position, near head 708 and magnet 712 causes first reed switch 714 to change state and complete an electrical circuit (not shown in FIG. 6A). In one example, an electrical circuit provides a voltage or other suitable signal to reverse the rotation of rollers 704 and move rod 702 away from head 708. As rod 702 moves through tube 706, first reed switch 714 changes state. In another example, control of the solenoid valve-is provided by an integrated software controller (not shown in FIG. 6A). The integrated software controller may be configured to detect the presence of magnet 712, in one embodiment, using reed switches 714 and 716.

FIG. 6B depicts planetary roller screw drive 700 in a second position with a limit sensing system, consistent with embodiments of the present disclosure. Magnet 712 is positioned on rod 702 such that when rod 702 moves through tube 706 and approaches base 710, magnet 712 approaches second reed switch 716 and causes second reed switch 716 to change state. This will complete an electrical circuit and provide a voltage or other suitable signal to reverse the rotation of rollers 704 and move rod 702 away from base 710.

Figure 7:
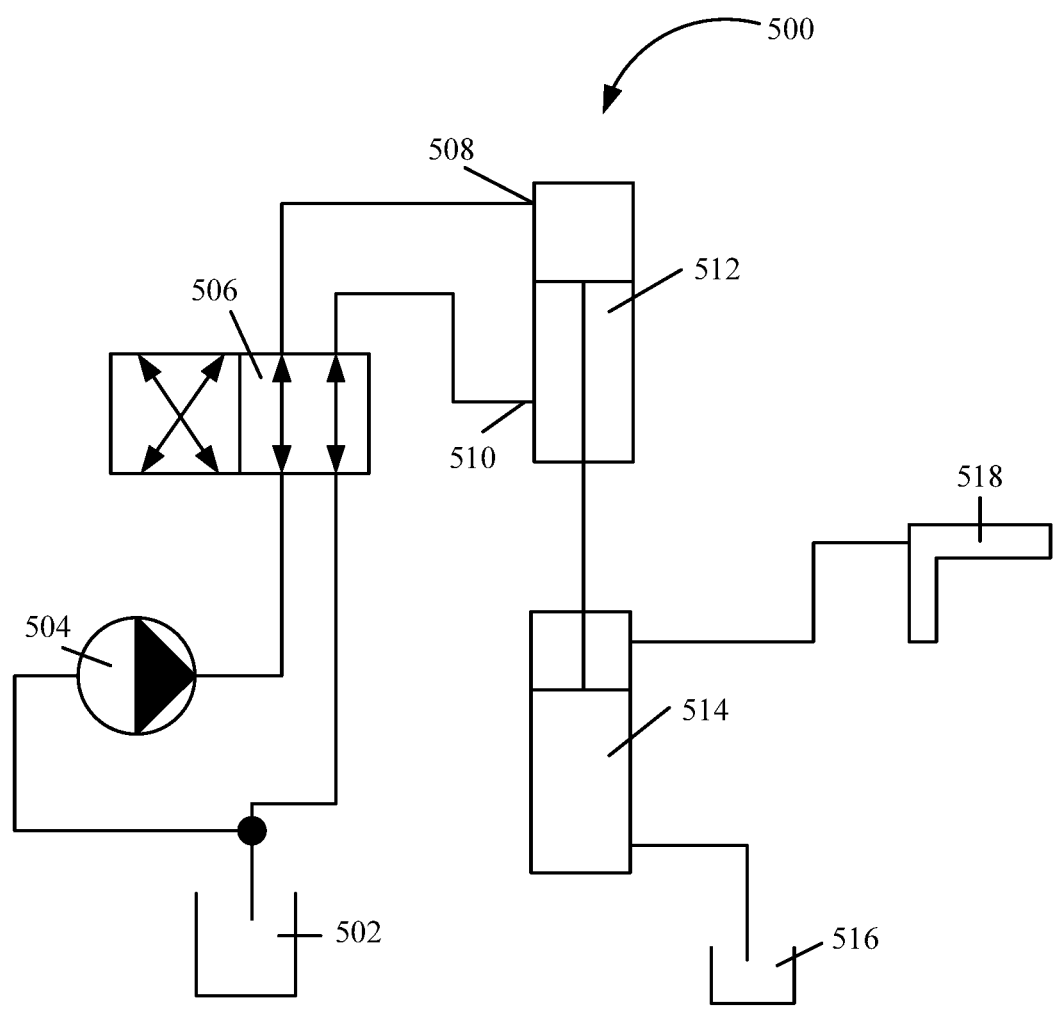
FIG. 7 depicts a hydraulic circuit in accordance with an embodiment of the present invention.

FIG. 7 depicts a hydraulic circuit in accordance with an embodiment of the present invention. In various embodiments, hydraulic circuit 500 can include a hydraulic reservoir 502, a hydraulic pump 504, a solenoid 506, a head port 508, a rod port 510, a hydraulic cylinder 512, a paint cylinder 514, a paint reservoir 516, and a spray gun 518. In certain embodiments, hydraulic pump 504 can pump hydraulic fluid from hydraulic reservoir 502 to solenoid 506. In FIG. 7, solenoid 506 is illustrated as a directional control valve. Directional control valves can allow fluid to flow into different paths from one or more sources. They can consist of a spool inside a cylinder and can be mechanically, electrically, and hydraulically controlled. Moreover, the movement of the spool can restrict or permit the flow of the hydraulic fluid from hydraulic reservoir 502.

In this embodiment, an electromechanical solenoid is used to operate a 4-way, 2 position valve since there are 2 spool positions and 4 valve ports. However, other position valves can be used. The 4-way, 2 position valve combined with the reed switch sensor (not shown in FIG. 7) enables fast switching between the down stroke and the up stroke of hydraulic cylinder 512. This allows hydraulic circuit 500 to achieve a consistent paint pressure. In this example, initially, head port 508 is the pressure port which is connected to hydraulic pump 504 and the rod port is connected to hydraulic reservoir 502. As the hydraulic fluid is directed into head port 508 the pressure inside hydraulic cylinder 512 forces the hydraulic piston to move down through hydraulic cylinder 512 and the hydraulic fluid is pushed out rod port 510 and back to hydraulic reservoir 502. Since hydraulic piston is attached to the paint piston, the paint piston also moves down through paint cylinder 514 and paint, located in the paint cylinder, is pushed into spray gun 518.

In one example, when the hydraulic piston has reached a stroke limit position, the reed switch sensor can provide a voltage that activates a set of MOSFETs and flip-flop integrated circuit (not shown in FIG. 7), causing solenoid 506 to slide the spool to its second position. As a result, rod port 510 is the pressure port which is connected to hydraulic pump 504 and the head port is connected to hydraulic reservoir 502. As the hydraulic fluid is directed into rod port 510 the pressure inside hydraulic cylinder 512 forces the hydraulic piston to move up through hydraulic cylinder 512 and the hydraulic fluid is pushed out the head port and back to hydraulic reservoir 502. Moreover, the paint piston also moves up through paint cylinder 514 and paint from paint reservoir 516 can be drawn up into paint cylinder 516.

In another example, solenoid 506 is controlled by an integrated software controller (not shown in FIG. 7), communicably coupled to solenoid 506. An integrated software controller may be useful to locate a position of the piston is detectable prior to start-up of the pump assembly.

Figure 8:
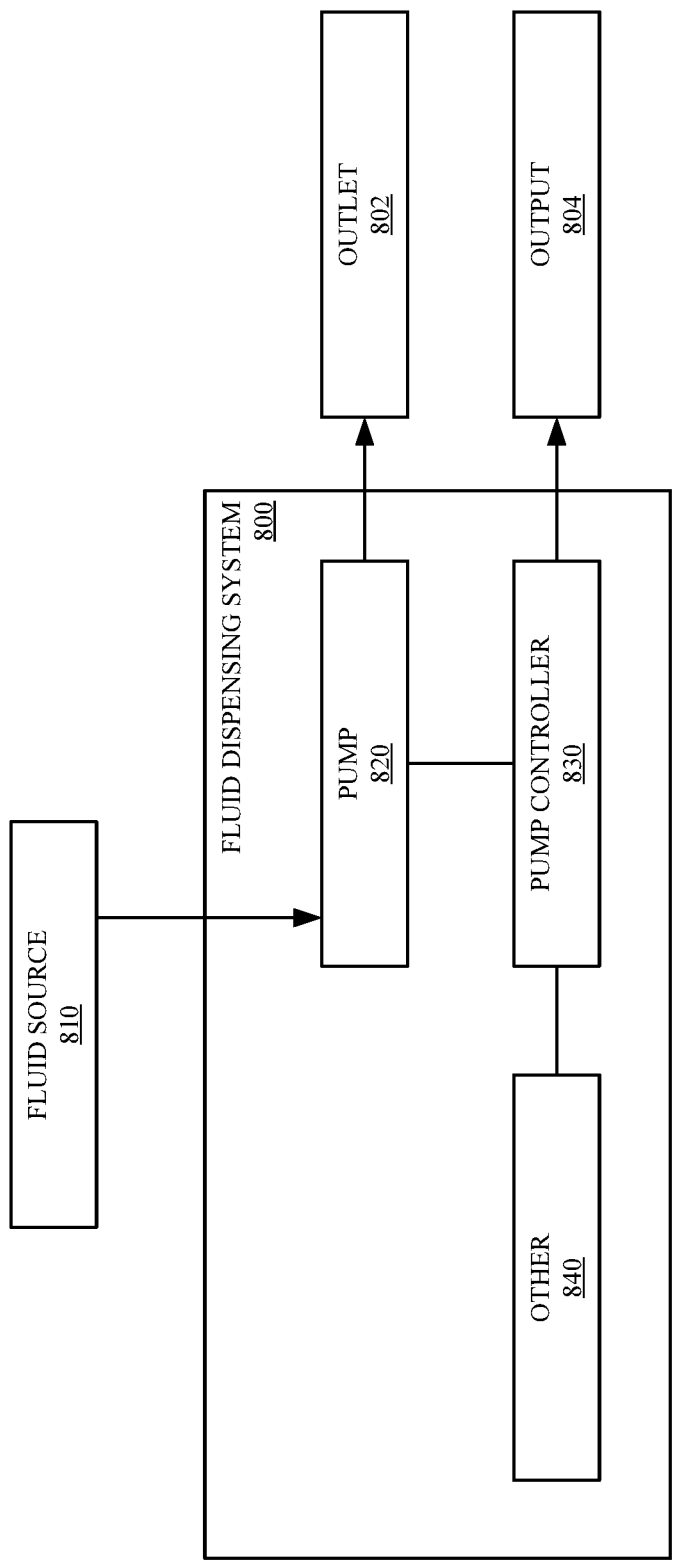
FIG. 8 depicts a system diagram for a liquid dispensing system in accordance with an embodiment of the present invention.

FIG. 8 depicts a system diagram for a liquid dispensing system in accordance with an embodiment of the present invention. Fluid dispensing system 800 may be useful, for example, for dispensing paint, or other exemplary fluids such as primers, coatings, plural components, etc. System 800 may comprise a fluid source 810 operably coupled to a pump 820 within fluid dispensing system 800. Pump 820 may comprise, for example, a planetary roller screw pump such as that presented in FIGS. 5A and 5B, or a hydraulic pump such as that presented in FIG. 3. Pump 820 is operably coupled to a pump controller 830. Pump 820 may be configured to pressurize, or otherwise deliver fluid from fluid source 810 to an outlet 802. Controller 830 may be configured, in one example, to provide an output 804. In one example, output 804 comprises storing detected parameters concerning operation of pump 820 in a memory of controller 830. In another example, output 804 comprises delivery of detected parameters to a separate unit, for example downloading detected parameter information to a separate computing unit. In another example, output 804 comprises an audio or visual output, for example an audible alert or a visual indication, such as a separate display unit. Fluid dispensing system 800, in some embodiments, comprises other features 840 integral to the delivery of fluid from fluid source 810 to outlet 802. For example, in an embodiment where a fluid is delivered at a set temperature, other functionality 840 comprises a heater. Additionally, in some embodiments, fluid may be transferred a significant distance from pump 820 to outlet 802. Other functionality 840 may comprise a transport mechanism in such embodiments.

Figure 9:
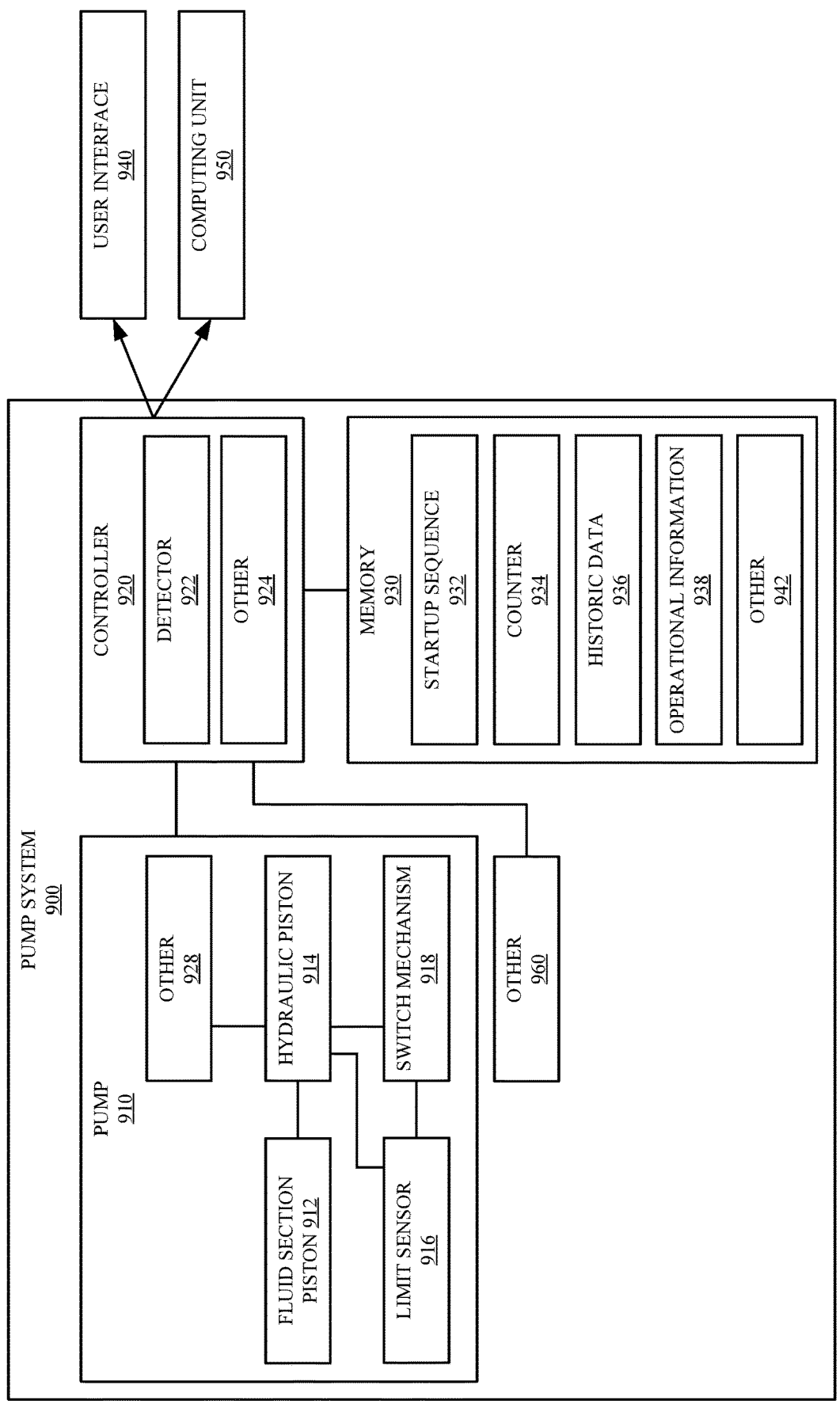
FIG. 9 depicts a diagram of a pump system control in accordance with an embodiment of the present invention.

FIG. 9 depicts a diagram of a pump system control in accordance with an embodiment of the present invention. Pump 910 of pump system 900 may, in one example, comprise a planetary roller screw pump system such as that presented in FIGS. 5A and 5B. In another example, pump 910 comprises a hydraulic pump system, such as that presented in FIG. 3. However, pump system 900 may also be useful with other exemplary pump configurations.

Pump 910 comprises, in one example, a fluid section piston 912 coupled to a hydraulic piston 914. Movement of hydraulic piston 914 is limited, in one example, by one or more switching mechanisms 918. Switching mechanisms 918 may comprise reed switches, for example. However, other switching mechanisms 918 may also be used. For example, an integrated software controller 920 may be configured to control a solenoid. Pump 910 may also include one or more limit sensors 916. Pump 910 may also comprise other components 928.

Controller 920, in one example, is configured to operably control and monitor pump 910. Controller 920, in one embodiment, comprises a detector 922 configured to detect a position of fluid section piston 912 prior to operation of pump 910. Detector 922 may receive a signal from limit sensor 916, for example, indicating a position of fluid section piston 912 within an operational loop. For example, fluid section piston 912 may be mid-stroke, topped out, bottomed out, or in another position within an operational loop. Knowing a detected position of fluid section piston 912 within an operational loop may allow for controller 920 to resume a normal operational loop of fluid section piston 912 based on its detected current position. Controller 920 may also comprise other functionality 924.

During a normal operational cycle, controller 920, in one embodiment, is responsible for controlling movement of fluid section piston 912 within a cylinder. For example, as fluid section piston 912 moves toward an end of a stroke, limit sensor 916 can send an indication, to detector 922, causing the controller to switch the direction of piston movement, for example using switching mechanism 918. Switching mechanism 918 can comprise, for example, a reed switch, in one embodiment. Alternatively, in one embodiment, switching mechanism 918 comprises a solenoid coupled to the controller. In another embodiment, switching mechanism 918 comprises a solenoid coupled to a MOSFET and a flip-flop integrated circuit system.

Limit sensor 916 can comprise, in one embodiment, a hall-effect sensor. In another embodiment, limit sensor 916 comprises a photoelectric sensor. In another embodiment, limit sensor 916 comprises a mechanical sensor. In another embodiment, limit sensor 916 comprises a base active transducer sensor. In another embodiment, limit sensor 916 comprises an eddy-current sensor. In another embodiment, limit sensor 916 comprises an inductive position sensor. In another embodiment, limit sensor 916 comprises a photodiode array sensor. In another embodiment, limit sensor 916 comprises a proximity sensor. However, other suitable limit sensors 916 are also envisioned. For example, in one embodiment, limit sensor 916 comprises an anisotropic magneto-resistive (AMR). In another embodiment, limit sensor 916 comprises a giant magneto-resistive (GRM) magnetic sensor.

Controller 920 may be coupled, in one example, to a memory 930. Memory 930 is illustratively shown as part of pump system 900. However, in another example, at least some portions of memory 930 are stored remotely from pump system 900. For example, a start-up sequence 932 may be stored within an integrated memory coupled to controller 920 such that controller 920 can retrieve sequence 932 and engage pump 910. However, historic data 936 may only be accessible when integrated controller 920 is coupled to a remote computing system 950, where current operational information 938 may be downloaded and compared to historic data 936 to track operational parameters related to operation of pump 910 over time. Memory 930 may also store a counter 934. Counter 934 may be responsible for tracking a total cycle count of pump 910, a live cycle-rate counter, and/or track a run time of pump 910 for a given operation. Memory 930 may also comprise other functionality 942.

Pump system 900 may also illustratively comprise a user interface 940. User interface 940 may allow an operator to interact with controller 920. User interface 940 may comprise an input/output mechanism, such as a set of buttons, keys, etc. User interface 940 may comprise a display attached to pump system 900. User interface 940, in another example, may comprise a display on a separate computing unit 950, such that interaction with controller 920 and memory 930 is limited to a configuration where controller 920 is communicably coupled with separate computing unit 950, for example during or after a download of operational information 938 from memory 930. Pump system 900 may also comprise other functionality 960, for example a heating mechanism to heat a fluid prior to delivery to an outlet, or a transport mechanism configured to transport pressurized fluid to an outlet.

Figure 10:
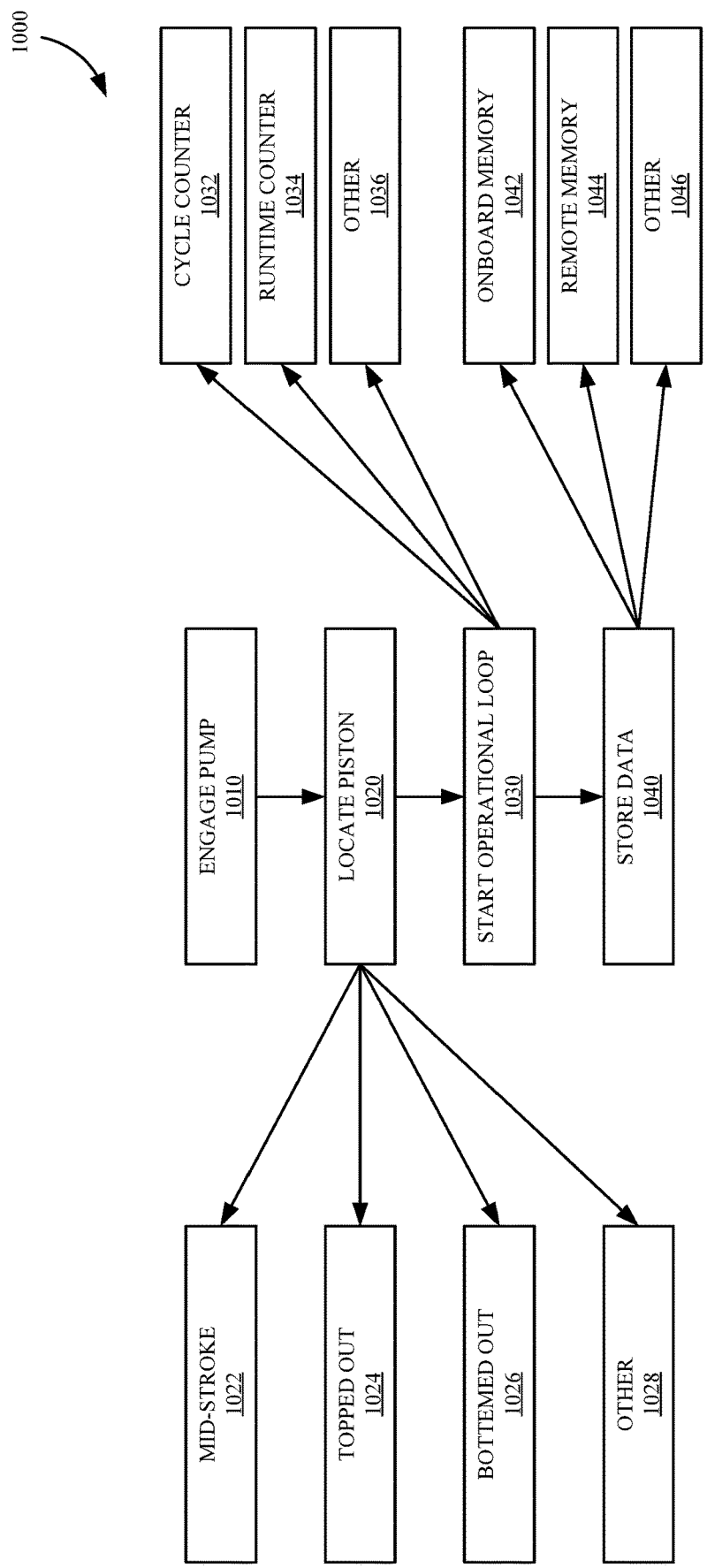
FIG. 10 depicts a flow diagram of a method for start-up of a pump control system in accordance with an embodiment of the present invention.

FIG. 10 depicts a flow diagram of a method for start-up of a pump control system in accordance with an embodiment of the present invention. In one example, a system controller, such as controller 920, retrieves a start-up sequence, such as sequence 932, from an integrated memory 930. Start-up sequence 932 may, for example, provide instructions for implementing method 1000.

In block 1010, a pump system is engaged. Engaging the pump system may comprise turning on an associated motor, initiating priming operations, and/or other appropriate start-up operations.

In block 1020, a piston position is located. For example, as a result of a previously completed operation, a piston may be detected as mid-stroke, as indicated in block 1022, topped out, as indicated in block 1024, bottomed out, as indicated in block 1026, or in another position, as indicated in block 1028. A controller, knowing the location of a piston, may be able to start a normal operational loop from the present location, instead of having to estimate a position.

In block 1030, an operational loop is started. The operational loop may be initiated, in part, based on a detected location of the piston, in one example. Starting the operational loop in block 1030 may also comprise a controller retrieving and initiating one or more parameter tracking sequences. For example, the controller can retrieve and initiate a cycle counter, as indicated in block 1032. A cycle counter may comprise a live operational cycle counter, for example starting at '0 cycles.' In another example, a cycle counter may comprise a lifetime cycle counter for a pump system, such that a controller retrieves a total cycle count, for example, comprising a cycle count at the end of a previous operation, and continue counting through a present operation, providing an ending cycle counter for the beginning of the next operation. Starting an operational loop, in block 1030, may also comprise the controller retrieving a runtime tracking sequence and starting a runtime counter, as indicated in block 1034, which may provide an ongoing indication of how long a current operation has been ongoing. Starting an operational loop may also comprise starting other parameter tracking sequences, as indicated in block 1036.

In block 1040, in some embodiments, data regarding an operation is stored. For example, runtime counter information, cycle counter information, or other parameter data can be tracked and stored for a given operation. Such data may also be accumulated and stored over time, for example to provide diagnostic information. Data can be stored, in one embodiment, in an onboard memory associated with the pump control system, as indicated in block 1042. Data can also be stored, in one embodiment, in a remote memory component, as indicated in block 1044, for example associated with a separate computing unit. Data can also be stored in other configurations, as indicated in block 1046.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A paint delivery system comprising:
 a piston movable within a cylinder between a first limit position and a second position during an operational cycle to pressurize paint from a source of paint;
 a rod connected to the piston and extending out of the cylinder;
 a motor configured to drive motion of the piston within the cylinder;
 one or more sensors configured to generate a sensor signal, prior to movement of the piston, indicative of a position of the rod with respect to the first limit position or the second limit position; and
 a controller configured to receive the sensor signal and programmatically control the paint delivery system based on the indicated position, wherein the controller is configured to detect that the piston is in a mid-stroke position between the first limit position and the second limit position, based on the sensor signal indicative of the position of the rod prior to movement of the piston.

2. The paint delivery system of claim 1, wherein the controller is configured to initiate a start-up sequence by determining the position of the rod based on the sensor signal, and wherein the controller is configured to retrieve start-up sequence information stored in a memory component based on the position of the rod.

3. The paint delivery system of claim 1, wherein the controller is configured to initiate a parameter tracking sequence that tracks an operating parameter of the paint delivery system.

4. The paint delivery system of claim 3, wherein the parameter tracking sequence is a run-time tracking sequence that, tracks a set number of completed cycles by the piston, wherein a cycle is completed when the piston moves from the first limit position to the second limit position and returns to the first limit position.

5. The paint delivery system of claim 1, wherein the controller is configured to receive cycle tracking information from the sensor indicative of a number of completed cycles by the piston, wherein the controller is configured to store the cycle tracking information in a memory component.

6. The paint delivery system of claim 5, wherein the cycle tracking information comprises generating an estimated volume of paint pumped by the piston.

7. The paint delivery system of claim 1, wherein the sensor is selected from the group consisting, of: a hall-effect sensor, a photoelectric sensor, a mechanical sensor, a base active transducer sensor, an eddy-current sensor, an inductive position sensor, a photo mode array sensor, and a proximity sensor.

8. A method for operating a paint dispensing system, the method comprising:
   engaging a pump assembly of the paint dispensing system;
   initiating, using a controller of the paint dispensing system, a start-up sequence for the pump assembly;
   detecting, based on a sensor signal generated by a limit sensor, a location of a piston rod with respect to an operational axis of the piston rod prior to initiating movement of the piston rod, wherein detecting the location of the piston rod comprises detecting that a piston, attached to the piston rod, is in a mid-stroke position;
   initiating an operational loop, to move the piston rod, based on the detected location of the piston;
   tracking, using the controller, operational parameter data relative to function of the paint dispensing system; and
   storing the operational parameter data.

9. The method of claim 8, and further comprising:
   retrieving the start-up sequence from a memory within the paint dispensing system.

10. The method of claim 8, wherein the operational parameter data is stored within a memory component accessible by the controller.

11. The method of claim 8, wherein the piston rod location is periodically reported to the and stored within a memory component associated with the paint dispensing system.

12. The method of claim 8, wherein the operational parameter data comprises run-time tracking information.

13. The method of claim 8, wherein the operational parameter data comprises cycle tracking information.

14. A pump assembly configured to pressurize a paint, the pump assembly comprising:
   a pump comprising a piston attached to a piston rod, wherein the piston rod is configured to move along an operational axis between a first limit position and a second limit position, wherein movement between the first and second limit position is controlled by a switch mechanism;
   a memory storing a start-up sequence for the pump assembly;
   a position sensor configured to sense a portion of the piston rod along the operational axis prior to an initiation of movement of the piston rod and generate sensor signal indicative of the position of the portion of the piston rod prior to the initiation of movement of the piston rod;
   a controller coupled to the position sensor, the controller configured to determine that the piston is in a mid-stroke position, based on the sensor signal, prior to the initiation of the movement of the piston rod and, engage the stored start-up sequence base on the determined position of the portion of the piston rod to initiate movement of piston rod; and
   wherein the controller is configured to programmatically control the pump assembly based on the determined position of the portion of the piston rod.

* * * * *